United States Patent
Fang

(10) Patent No.: US 9,323,940 B2
(45) Date of Patent: Apr. 26, 2016

(54) RIGHTS CONTROL METHOD AND APPARATUS FOR DIGITAL LIVING NETWORK ALLIANCE

(75) Inventor: Lijun Fang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 134 days.

(21) Appl. No.: 14/131,418

(22) PCT Filed: May 24, 2012

(86) PCT No.: PCT/CN2012/075975
§ 371 (c)(1),
(2), (4) Date: Jan. 7, 2014

(87) PCT Pub. No.: WO2013/086836
PCT Pub. Date: Jun. 20, 2013

(65) Prior Publication Data
US 2014/0137268 A1    May 15, 2014

(51) Int. Cl.
*G06F 7/04* (2006.01)
*G06F 21/60* (2013.01)
*H04L 29/06* (2006.01)

(52) U.S. Cl.
CPC ............ *G06F 21/606* (2013.01); *H04L 63/101* (2013.01); *H04L 63/20* (2013.01); *H04L 2463/101* (2013.01)

(58) Field of Classification Search
CPC .................................. G06F 21/10; G06F 21/31
USPC ..................................................... 726/26–30
See application file for complete search history.

(56) References Cited

U.S. PATENT DOCUMENTS

| 7,954,133 B2 | 5/2011 | Stavenow |
| 8,160,081 B2 | 4/2012 | Bae |

(Continued)

FOREIGN PATENT DOCUMENTS

| CN | 101170571 A | 4/2008 |
| CN | 101695060 A | 4/2010 |

(Continued)

OTHER PUBLICATIONS

International Search Report in international application No. PCT/CN2012/075975, mailed on Sep. 20, 2012.

(Continued)

*Primary Examiner* — Anthony Brown
(74) *Attorney, Agent, or Firm* — Oppedahl Patent Law Firm LLC

(57) ABSTRACT

Disclosed in the disclosure are a rights control method and an apparatus for Digital Living Network Alliance (DLNA). An address/rights recoding unit is expanded at a DLNA apparatus side to record what addresses and corresponding rights; a service control program is expanded at the DLNA apparatus side, and when another DLNA apparatus requires the present DLNA apparatus to provide a service, the address of said another DLNA apparatus and the address/rights recording unit are compared and the rights is found out. Only users with a Media Access Control (MAC) address set as allowed to have related service can be allowed to use the service of the DLNA apparatus of the technology and to obtain Extensible Markup Language (XML) files of the apparatus and the service description. The service of DLNA service points can be flexibly arranged so as to enable different access users to obtain different rights, thus well guaranteeing the security of the multimedia data and the flexibility of the multimedia service management. The security, privacy and manageability of the DLNA apparatus are ensured.

8 Claims, 2 Drawing Sheets

(56) References Cited

U.S. PATENT DOCUMENTS

| | | |
|---|---|---|
| 2007/0208948 A1 | 9/2007 | Costa-Requena et al. |
| 2007/0237115 A1 | 10/2007 | Bae |
| 2009/0106414 A1 | 4/2009 | Stavenow |
| 2009/0265551 A1 | 10/2009 | Tripunitara et al. |
| 2011/0107436 A1* | 5/2011 | Cholas et al. .......... 726/29 |
| 2014/0337934 A1 | 11/2014 | Tripunitara et al. |

FOREIGN PATENT DOCUMENTS

| | | |
|---|---|---|
| CN | 101741901 A | 6/2010 |
| CN | 101809933 A | 8/2010 |
| CN | 102510371 A | 6/2012 |
| JP | 2009147571 A | 7/2009 |
| JP | 2009187107 A | 8/2009 |
| JP | 2013511887 A | 4/2013 |
| JP | 2014531071 A | 11/2014 |
| WO | 2011021378 A1 | 2/2011 |
| WO | 2011062529 A1 | 5/2011 |

OTHER PUBLICATIONS

English Translation of the Written Opinion of the International Search Authority in international application No. PCT/CN2012/075975, mailed on Sep. 20, 2012.

Supplementary European Search Report in European application No. 12858063.6, mailed on Feb. 17, 2015.

\* cited by examiner

RIGHTS CONTROL METHOD AND APPARATUS FOR DIGITAL LIVING NETWORK ALLIANCE

TECHNICAL FIELD

The disclosure relates to the field of communication technologies, and in particular to a rights control method and an apparatus for Digital Living Network Alliance (DLNA).

BACKGROUND

At present, the DLNA is aimed at solving the problem of interconnection and interoperability between wired networks and wireless networks including Personal Computers (PC), consumption appliances and mobile devices.

An Universal Plug and Play (UPnP) is a core part of a "digital home" network protocol set designed for ease of use, is the most pervasive mode for a device to connect a "digital home" network and a common protocol for the device to communicate through the "digital home" network, and is established on widely accepted and universally applicable Internet Protocols (IP), therefore devices from different manufacturers can work together easily, thus realizing content sharing and computing anytime and anywhere. UPnP defines an interoperating mechanism among devices from five aspects, including addressing, searching, control, eventing, and presentation.

It is specified in UPnP that, after accessing a network and obtaining an IP address, a device broadcasts a service to a control point on the network by using Simple Service Discovery Protocol (SSDP), and after the control point accesses the network and obtains the IP address, an interested device is searched on the network by applying SSDP to send a searching request. Basic information exchange in the operation above is a discovery message which only includes little information of the device, e.g. a device type, a device name, and a pointer pointing to an Extensible Markup Language (XML) device description document.

After discovering a device, the control point still learns little about information of the device. At the moment, description files of the device are needed to be found according to a Uniform Resource Locator (URL) of the device description document in the discovery message to obtain more description information from these files. There is a wide range of description information which is generally provided by the manufacturer of the device. The description information of the device includes: a control mode name and mode number, a device serial number, a manufacturer name, a manufacturer WEB URL, and embedded device or server description information and device control, device events, and an URL expressed by the device. The information is generally stored in specific XML files.

After finding device description, the control pointer will extract operations to be performed from the description and learn all services. To control a certain device, a control behavior request needs to be sent first to request the device to start a service, then a corresponding message (the control message is information in a Simple Object Access Protocol (SOAP) format in an XML file) is sent according to an URL of the device. Finally, the device will return response information indicating a service success or a service failure.

A device supporting UPnP which is in lack of a security guarantee mechanism is totally unprotected, thus any control point in the same network segment with the UPnP device is able to perform operations allowed by all service points for the device. Therefore, it is a problem to be solved to find a way to guarantee the security of the UPnP device.

SUMMARY

The purpose of the disclosure is to provide a rights control method and an apparatus for Digital Living Network Alliance (DLNA) to improve the use security of a DLNA apparatus.

To realize the purpose above, the technical solution of the disclosure is realized by the following way:

a rights control method for DLNA, including: expands an address/rights recoding unit at a DLNA apparatus side to record corresponding relations between addresses and rights; expands a service control program at the DLNA apparatus side, and compares, when another DLNA apparatus requires the present DLNA apparatus to provide a service, the address of said another DLNA apparatus and the address/rights recording unit to find out rights of said another DLNA apparatus, wherein the method may further include: expands, at the DLNA apparatus side, rights and a list of services allowed because of the rights, wherein the method may further include: obtains a service list which can be obtained by an access user according to the rights of said another DLNA apparatus; if a service requested by the access user is in the service list which can be obtained within the rights, provides the service; otherwise, refuses to provide the service, wherein the requested service may include: requires the present DLNA apparatus to provide an XML file of a service or use a command to which the service corresponds so as to require a DLNA terminal to provide a service response, wherein before comparing the address of said another DLNA apparatus and the address/rights recording unit, the method may include: parses service control information sent by said another DLNA apparatus to obtain a Media Access Control (MAC) address of said another DLNA apparatus.

A rights control apparatus for DLNA, includes: a DLNA module, an MAC address control module and an MAC/rights correspondence list module, wherein the MAC/rights correspondence list module is configured to store a corresponding relation of the address of a control point allowed by a DLNA apparatus and rights;

the DLNA module is configured to obtain a service requesting instruction sent by another DLNA apparatus and forward the instruction to the MAC address control module;

the MAC address control module is configure to compare an address sent by said another DLNA apparatus and the MAC/rights correspondence list module to find out rights to which said another DLNA apparatus corresponds, wherein the apparatus may further include a rights/service correspondence list module, which is configured to store corresponding relations between DLNA rights and services, wherein the MAC address control module may be configured to obtain a service list which can be obtained by an access user according to the rights of said another DLNA apparatus; if a service requested by the access user is in the service list which can be obtained within the rights, the DLNA module may be configured to provide the required service; otherwise, the DLNA module may be configured to refuse to provide the related service, wherein the service requested by said another DLNA apparatus may include: requiring the present DLNA apparatus to provide an XML file of a service or using a service command to require the service, wherein before comparing an MAC address of said another DLNA apparatus and the MAC/rights correspondence list module, the DLNA module may be configured to parse service control information sent by said another DLNA apparatus to obtain an MAC address of said another DLNA apparatus.

To sum up, the disclosure has the following beneficial effect:

compared with the prior art, only users set as allowed to obtain an MAC address of a related service can be allowed to use a service of a DLNA apparatus and obtain XML files of apparatus and apparatus service description. Services of DLNA service points can be flexibly arranged so as to enable different access users to obtain different rights, thus guaranteeing the security of multimedia data and the flexibility of multimedia service management. The security, privacy and manageability of the DLNA apparatus are ensured.

DETAILED DESCRIPTION

Given the disadvantages of an UPnP mechanism used by DLNA, the disclosure provides a method for controlling rights of a DLNA multimedia service by using an MAC address.

The main idea of the technical solution of the disclosure is as follows:

Expands, at a DLNA apparatus side, rights and a list of services allowed because of the rights to indicate corresponding relations of rights of access users and services that can be provided;

expands an address/rights recording unit at the DLNA apparatus side to record corresponding relations between addresses and rights;

expands a service control program at the DLNA apparatus side; when another DLNA apparatus requires the present DLNA apparatus to provide an XML file of a service or uses a service command to require the service, compares the address of said another DLNA apparatus and the addresses in the address/rights recording unit and finds out rights of said another DLNA apparatus;

according to the found rights, obtains a service list which can be obtained by an access user; if a service requested by the access user is in a service list which can be obtained within the rights, provides the service required by the access user and provides an XML file of related service description; otherwise, refuses to provide the related service and the XML file of the related service description.

The disclosure provides a method for controlling rights of a DLNA multimedia service by using an address to solve potential security problems of UPnP protocols used by a DLNA apparatus, thus ensuring the security of multimedia data. The address is illustrated as an MAC address in the following embodiment.

An implementation method of the disclosure will be described hereinafter in combination with the accompanying drawings.

Figure 1:
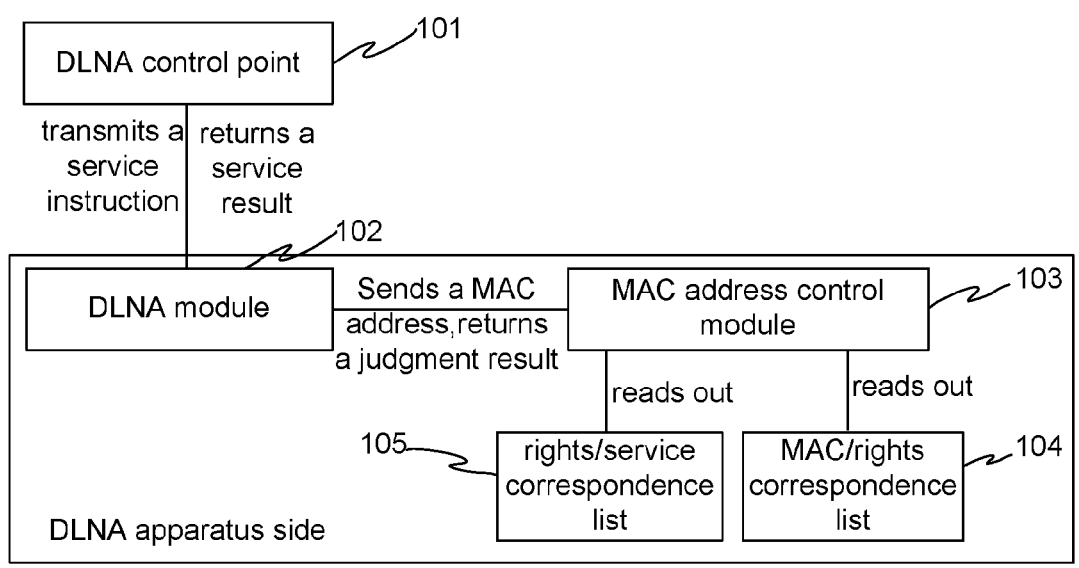
FIG. 1 is a schematic diagram illustrating a rights control apparatus for DLNA in an embodiment of the disclosure.

As shown in FIG. 1, which is a schematic diagram illustrating a rights control apparatus for DLNA in an embodiment of the disclosure. The DLNA apparatus in the present embodiment is illustrated as a Third Generation (3G) wireless router. The 3G wireless router is connected to a plurality of terminals including PCs through Wireless Fidelity (WiFi). The terminals including PCs etc. send requests to the DLNA apparatus to obtain contents including films and images etc. on the DLNA. The DLNA apparatus, according to an MAC address of a terminal sending a request, makes a decision of acceptance or refusal to the request of the terminal. The apparatus includes a DLNA module 102, an MAC address control module 103, an MAC/rights correspondence list module 104 and a rights/service correspondence list module 105.

The DLNA control unit 101 in FIG. 1 is a DLNA control unit interacting with the DLNA apparatus, is generally located on another DLNA apparatus which will interact with the present DLNA apparatus, and is mainly configured to obtain an apparatus and service descriptor, and a related service from the apparatus of the disclosure.

The DLNA module 102 is configured to provide the service descriptor of the DLNA apparatus to a control point and obtain the related service.

The MAC address control module 103 is mainly configured to parse a data packet in the control point of the DLNA apparatus to obtain an MAC address therein, and read an MAC/rights permission list stored in a flash memory of the disclosure, determine rights to which the MAC address of the control point correspond, read a rights/service list stored in the flash memory of the disclosure, and obtain a service allowed to be obtained by the access point according to the read rights, determine whether a service requested by the access point is in an allowed service list; if the service is in an allowed service list, make no modification in an IP data packet parsed out in an MAC layer so that an upper layer service may allow the control point to obtain the apparatus and service descriptor and allow the control point to obtained the related service; otherwise, add a flag to the IP packet obtained through parsing, and the DLNA apparatus directly refuses a related request of the control point according to the flag.

MAC/rights correspondence list module 104: an MAC/rights list stored in the flash memory of the DLNA apparatus of the disclosure, mainly configured to store a corresponding relation between an MAC address of an allowed control point and rights so that rights of an access point can be obtained by searching the list according to an MAC address of the access point.

Rights/service correspondence list module 105: a rights/service list stored in the flash memory of the DLNA apparatus of the disclosure, mainly configured to store a corresponding relation between the rights of the allowed control point and a service so that a range of services that can be used by the access point can be obtained by searching the list according to the rights of the access point.

Figure 2:
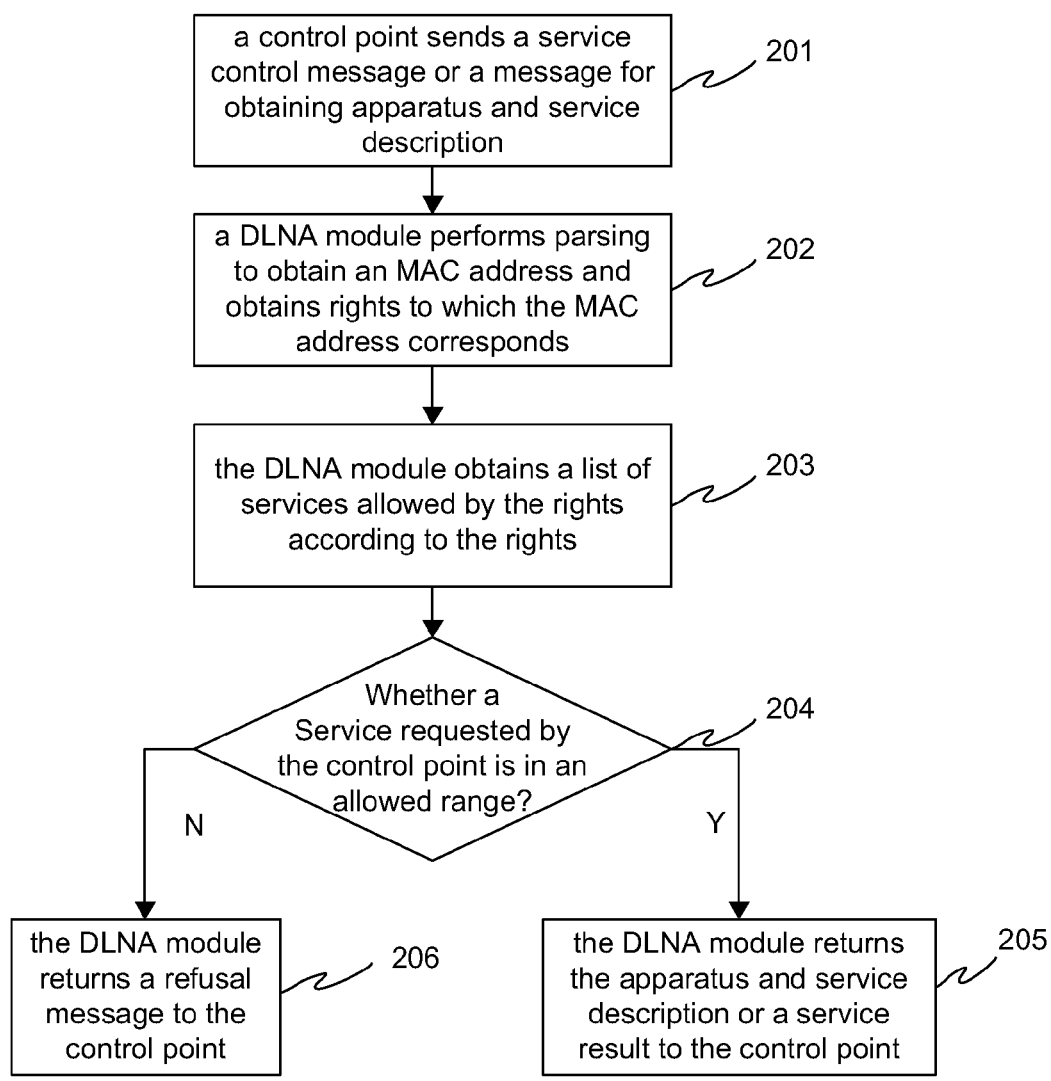
FIG. 2 is a flowchart of a rights control method for DLNA in an embodiment of the disclosure.

Referring to FIG. 2, which is a flowchart of a rights control method for DLNA in an embodiment of the disclosure, the specific flow is as follows:

Step 201: a DLNA control point sends a service control message or a message for obtaining apparatus and service description;

Step 202: after receiving the related control message, a DLNA module performs related parsing to obtain an MAC address of a source address, and obtains rights to which the MAC address correspond according to an MAC address/rights list stored in a flash memory;

Step 203: the DLNA module obtains, according to the rights obtained in Step 202 and a rights/service list stored in the flash memory, a list of services allowed by the rights;

Step 204: the DLNA module determines whether a service requested by a user is in the service list obtained in Step 203; if yes, turns to Step 205; otherwise, turns to Step 206;

Step 205: the DLNA module returns the apparatus and service description or a service result to the control point according to a normal process;

Step 206: the DLNA module returns a refusal message to the control point.

Thus, the DLNA rights control method of the disclosure can expand an address/rights recording unit at a DLNA apparatus side to record corresponding relations of addresses and rights, expand a service control program at the DLNA apparatus side to, when another DLNA apparatus requires the present DLNA apparatus to provide a service, compare the address of said another DLNA apparatus and the address/rights recording unit to find out rights of said another DLNA apparatus. In addition, rights and a list of services allowed because of the rights can be further expanded at the DLNA apparatus side. Additionally, a service list which can be obtained by an access user can be further obtained according to the rights of said another DLNA apparatus. If a service requested by the access user is in the service list which can be obtained according to the rights, the service is provided. Otherwise, the service is refused.

Specifically, the requested service may include: requiring the present DLNA apparatus to provide an XML file of a service or using a command to which the service corresponds to require a DLNA terminal to provide a service response. Before comparing the address of said another DLNA apparatus and the address/rights recording unit, service control information sent by said another DLNA apparatus may be further parsed to obtain an MAC address of said another DLNA apparatus.

On the other hand, a rights control apparatus for DLNA of the disclosure may include a DLNA module, an MAC address control module and an MAC/rights correspondence list module, wherein the MAC/rights correspondence list module is configured to store a corresponding relation between an address of a control point allowed by a DLNA apparatus and rights;

the DLNA module is configured to obtain a service requesting instruction sent by another DLNA apparatus and forward the instruction to the MAC address control module;

the MAC address control module is configured to compare an address sent by said another DLNA apparatus and the MAC/rights correspondence list module to find out rights to which said another DLNA apparatus corresponds.

The apparatus of the disclosure may further include a rights/service correspondence list module, which is configured to store corresponding relations of DLNA rights and services.

Specifically, the MAC address control module may obtain, according to the rights of said another DLNA apparatus, a service list which can be obtained by an access user; if a service requested by the access user is in the service list which can be obtained by the rights, the DLNA module is configured to provide the required service; otherwise, the DLNA module is configured to refuse to provide the related service.

In addition, a service requested by said another DLNA apparatus may include: requiring the present DLNA apparatus to provide an XML file of a service or using a service command to require the service.

In addition, before comparing the MAC address of said another DLNA apparatus and the MAC/rights correspondence list module, the DLNA module may parse service control information sent by said another DLNA apparatus to obtain the MAC address of said another DLNA apparatus.

To sum up, it can be learn that the disclosure has the following characteristics: only users set as allowed to obtain an MAC address of a related service can be allowed to use a service of a DLNA apparatus of the technology and to obtain XML files of apparatus and apparatus service description. Services of DLNA service points can be flexibly arranged so as to enable different access users to obtain different rights, thus guaranteeing the security of multimedia data and the flexibility of multimedia service management. The security, privacy and manageability of the DLNA apparatus are ensured.

The above are only preferred embodiments of the disclosure and should not be used to limit the protection scope of the disclosure.

The invention claimed is:

1. A rights control method for Digital Living Network Alliance (DLNA), comprises: expanding an address/rights recording unit at a DLNA apparatus side to record addresses and rights allowed by the addresses; expanding a service control program at the DLNA apparatus side, and comparing, when another DLNA apparatus requires the present DLNA apparatus to provide a service, the address of said another DLNA apparatus and the address/rights recording unit to find out rights of said another DLNA apparatus, wherein the method further comprises: expanding, at the DLNA apparatus side, rights and a list of services allowed because of the rights; and obtaining a service list which can be obtained by an access user according to the rights of said another DLNA apparatus; if a service requested by the access user is in the service list which can be obtained within the rights, providing the service; otherwise, refusing to provide the service.

2. The method according to claim 1, wherein the requested service comprises: requiring the present DLNA apparatus to provide an Extensible Markup Language (XML) file of a service or using a command to which the service corresponds so as to require a DLNA terminal to provide a service response.

3. The method according to claim 1, wherein before comparing the address of said another DLNA apparatus and the address/rights recording unit, the method comprises: parsing service control information sent by said another DLNA apparatus to obtain a Media Access Control (MAC) address of said another DLNA apparatus.

4. A rights control apparatus for DLNA, comprises: a DLNA module, an MAC address control module and an MAC/rights correspondence list module, wherein the MAC/rights correspondence list module is configured to store an address of a control point allowed by a DLNA apparatus and rights allowed by the address;

the DLNA module is configured to obtain a service requesting instruction sent by another DLNA apparatus and forward the instruction to the MAC address control module;

the MAC address control module is configure to compare an address sent by said another DLNA apparatus and the MAC/rights correspondence list module to find out rights to which said another DLNA apparatus corresponds, wherein the apparatus further comprises a rights/service correspondence list module, which is configured to store DLNA rights and services allowed because of the DLNA rights; and wherein the MAC address control module is configured to obtain a service list which can be obtained by an access user according to the rights of said another DLNA apparatus; if a service requested by the access user is in the service list which can be obtained within the rights, the DLNA module is configured to provide the required service; otherwise, the DLNA module is configured to refuse to provide the related service.

5. The apparatus according to claim 4, wherein the service requested by said another DLNA apparatus comprises: requiring the present DLNA apparatus to provide an XML file of a service or using a service command to require the service.

6. The apparatus according to claim 4, wherein before comparing an MAC address of said another DLNA apparatus and the MAC/rights correspondence list module, the DLNA module is configured to parse service control information sent by said another DLNA apparatus to obtain an MAC address of said another DLNA apparatus.

7. The method according to claim 1, wherein before comparing the address of said another DLNA apparatus and the address/rights recording unit, the method comprises: parsing service control information sent by said another DLNA apparatus to obtain a Media Access Control (MAC) address of said another DLNA apparatus.

8. The method according to claim 2 wherein before comparing the address of said another DLNA apparatus and the address/rights recording unit, the method comprises: parsing service control information sent by said another DLNA apparatus to obtain a Media Access Control (MAC) address of said another DLNA apparatus.

* * * * *